May 3, 1966

W. H. LEITTON ETAL 3,249,931

ELAPSED TIME INDICATOR

Filed Aug. 26, 1963

INVENTORS
WILLIAM H. LEITTON
LEWIS E. SCHOONMAKER

BY Mandeville & Schweitzer
ATTORNEYS

May 3, 1966    W. H. LEITTON ETAL    3,249,931
ELAPSED TIME INDICATOR

Filed Aug. 26, 1963    2 Sheets-Sheet 2

INVENTORS
WILLIAM H. LEITTON
LEWIS E. SCHOONMAKER
BY
Mandeville & Schweitzer
ATTORNEYS

United States Patent Office

3,249,931
Patented May 3, 1966

3,249,931
ELAPSED TIME INDICATOR
William H. Leitton, Woodbury, and Lewis E. Schoonmaker, Marion, Conn., assignors to The Sessions Clock Company, Forestville, Conn., a corporation of Connecticut
Filed Aug. 26, 1963, Ser. No. 304,571
6 Claims. (Cl. 340—309.2)

The present invention relates to elapsed time indicators and more particularly to a new and improved, miniaturized, resettable, elapsed time indicator having a linear scale, an alarm device, and other desirable features incorporated therein.

An object of the present invention is to provide a simple, reliable and economical indicator which visually and audibly provides a signal after analogically displaying the elapse of a predetermined period of time.

Another object of the invention is to provide a timer which may be reset with a minimum of effort upon the completion of a timing interval.

A further object is to provide an elapsed time indicator which initiates an alarm and is automatically self-stopping upon the completion of a timing cycle.

Another object of the present invention is to provide a miniaturized elapsed time indicator having a linear scale, which timer may be manufactured extremely economically and may be contained in an extremely small and compact housing.

Specifically, the elapsed time indicator of the present invention includes a timing motor whose output is suitably geared down to drive an indicator needle along a guide track and a linear, graduated scale aligned therewith. The displacement of the needle along the guide track is directly proportional to the elapsed running time of the motor. More specifically, the indicator needle is translated by a novel follower assembly and a rotating screw arrangement in which the follower assembly, itself, is adapted to actuate a switch at the end of its travel, the length of which is determined by the period to be timed, to initiate an alarm signal and to re-energize the timing motor.

For a better understanding of the invention, reference should be had to the following detailed description taken in conjunction with the accompanying drawing, in which:

FIG. 1 is a front elevational view of a preferred embodiment of an elapsed time indicator mechanism embodying the principles of the present invention;

FIGS. 2 and 3 are cross-sectional views of the mechanism of FIG. 1 taken along lines 2—2 and 3—3, respectively thereof;

Figure 1:
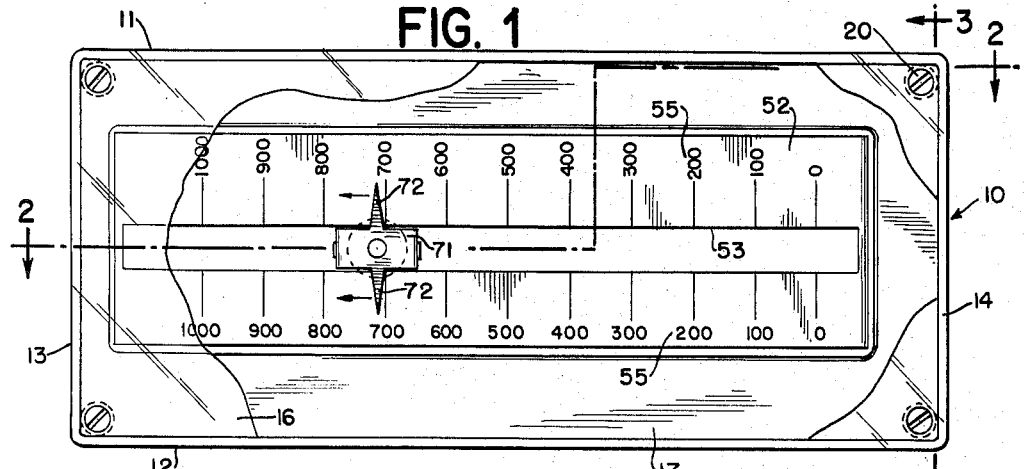
Figure 2:
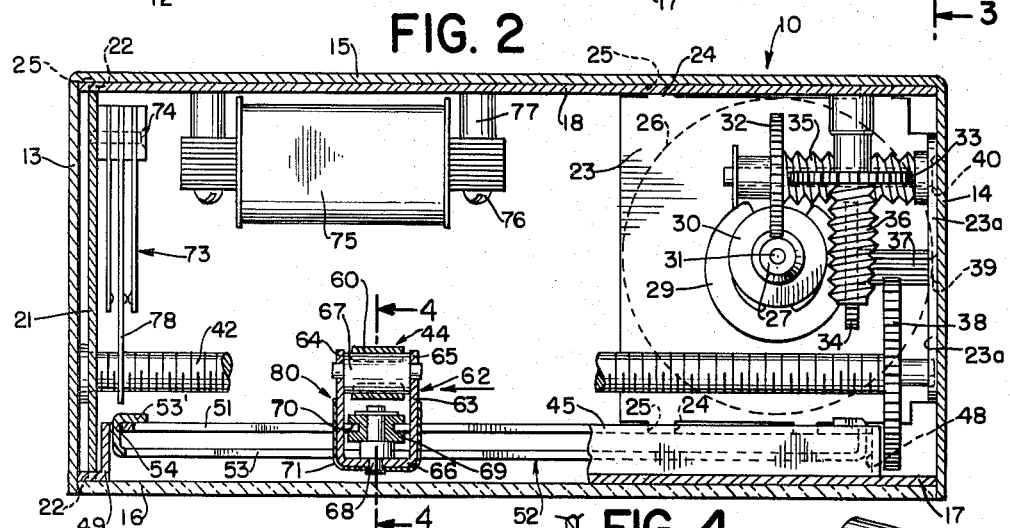

Referring now to the drawing and initially to FIGS. 1 and 2 thereof, a preferred embodiment of the elapsed time indicator of the present invention is completely contained in a miniature rectangular housing indicated generally by reference numeral 10 and including top and bottom walls 11, 12, side walls 13, 14, and a rear wall 15. The miniature housing 10, whose typical dimensions are about 2⅜ inches in length, 1½ inches in height, and 1⅝ inches in width, is closed at its face by a transparent screen 16.

Figures 3, 4, 5:
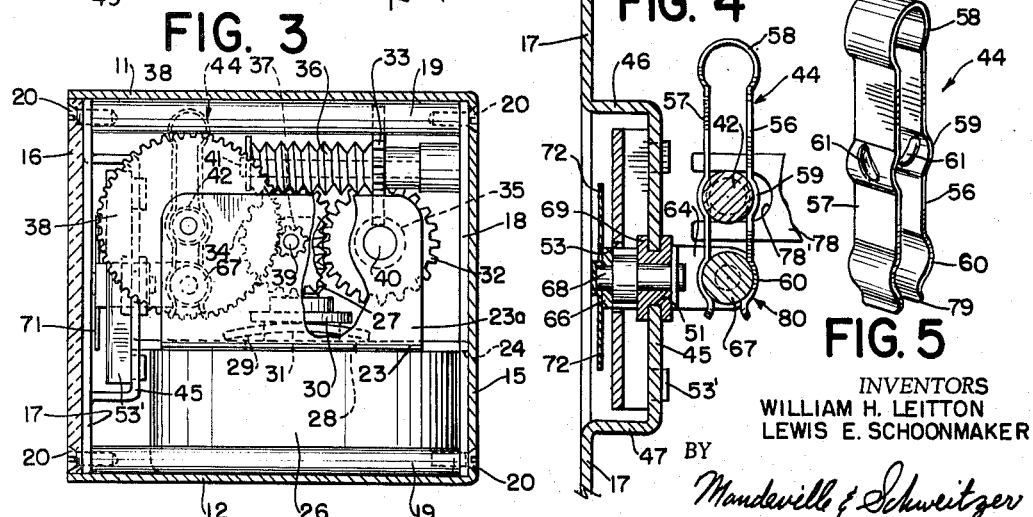
FIG. 4 is a cross-sectional view of the indicating mechanism of the present invention taken along line 4—4 of FIG. 2.
FIG. 5 is a perspective view of a spring follower clip utilized in the mechanism of the invention.
Figure 6:
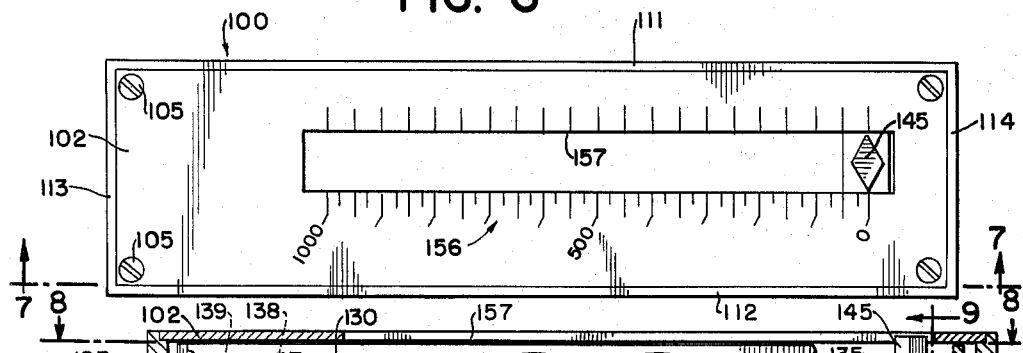
FIG. 6 is a front elevational view of a simplified alternate preferred embodiment of the elapsed time indicator of the present invention.

A front face plate 17 is located immediately adjacent and substantially flush with the screen 16 in a spaced relation to a rear support plate 18, which is mounted immediately adjacent to and substantially flush with the rear wall 15, by a series of spacer posts 19 which are joined to the rear wall of the housing and the front screen by a plurality of flat head screws 20. A switch deck 21, having projecting tabs 22, and a flanged motor deck 23, having projecting tabs 24, are supported between the face plate 17 and the support plate 18 by tab-receiving slits 25 therein, as shown in FIGS. 2 and 3.

In accordance with the invention, a timing motor 26 having an output worm 27 is secured to the motor deck 23 through a central opening 28 therein by means of an E-shaped clip 29 cooperating with an annular shoulder 30 on the output shaft 31 of the motor.

Typically, the timing motor is of the synchronous inductor type and advantageously is a Sessions Clock Co. (S-3000) series motor which, operating at 105–130 volts, 60 cycles per second, has an output of 300 revolutions per minute. The output of the motor 26 is suitably geared down through sets of perpendicularly arrayed worm wheels 32, 33, 34 and worms 35, 36 so that a pinion 37, integral with the worm wheel 34, engages and rotates a driving spur gear 38 at a predetermined rate, which rate is a direct function of the speed of the motor. The worm 36 and worm wheel 33 are an integral combination, as are the worm 35 and the worm wheel 32, and as are the worm wheel 34 and the pinion 37. The latter two combinations are mounted, respectively, on shafts 39, 40, which project from and are anchored to the motor deck flange 23a, while the integral worm 36 and worm wheel 33 combination are similarly supported by a shaft 41 which is anchored in the support plate 18.

In the first illustrated form of the invention, a rotatable drive screw 42 is provided which has the spur gear 38 fixedly mounted thereto and is supported longitudinally of the housing between the motor deck flange 23a and the switch deck 21. The spur gear 38 is driven by the pinion 37 to rotate the drive screw 42 at a rate which is proportional to the motor speed. A novel spring follower clip 44 is associated with the drive screw 42 and is adapted to convert rotary motion of the drive screw into a linear display which is indicative of the total elapsed time of operation of the timing motor.

For the purpose of creating the display, the front face plate 17 is provided with a longitudinally extending rectangular recess which has a rear wall 34, top and bottom walls 46, 47, and side walls 48, 49. The recess rear wall 45 has a rectangular opening 50 therein, the longitudinal edges of which constitute a guide track 51. A graduated scale 52 having a longitudinal slot 53 therein, is mounted in the recess away from the recess rear wall 45, with the slot 53 substantially coincident with the guide track 51. A pair of tabbed legs 53′ integral with the scale are supported in a series of slits 54 in the wall 45 and are bent inwardly, as shown in FIG. 2, to maintain the scale in a spaced relation with the recess rear wall 45. As shown in FIG. 1, the scale has dual graduations 55, which, advantageously, are calibrated in both vertical and horizontal orientation with respect to the slot 53, so that the scale may be read just as easily in a vertical position as in a horizontal position, the alternative positions in which the housing is adapted to be mounted in its ultimate applications.

The spring follower clip 44 of the present invention is a resilient, generally U-shaped member, advantageously fabricated from sheet material, having two elongated legs 56, 57 which are joined and normally urged toward one another by a substantially cylindrical, spring portion 58. Each spring leg includes a pair of concave portions 59, 60, the uppermost one of which includes an embossed screw thread 61. The concave portions 59, 60 of each leg oppose one another and form upper and lower gripping surfaces having a generally cylindrical shape or circular profile. Advantageously, the free ends of the legs 56, 57 include outwardly extending guide flanges 79 to facilitate their spreading. The follower clip 44 is adapted to be forced downwardly over the drive screw to enable the embossed threads 61 of the upper gripping surfaces 59 to engage it threadedly to allow the lower gripping surfaces to grip an indicating sub-assembly indicated generally at 62. As will be understood, rotation of the drive screw 42 will tend to drive the spring follower clip 44 and the gripped indicating sub-assembly 62, both of which comprise a follower assembly 80, from one end of the housing to the other at a rate which is a function of the speed of the motor.

The indicating sub-assembly 62 advantageously includes a U-shaped frame 63 which has a pair of arms 64, 65 and a base 66. In accordance with the invention, a rod 67 having substantially the same outside diameter as the drive screw 42 is mounted between the arms 64, 65 while a supporting shaft 68 is anchored in and projects from the base 66. The shaft 68 rotatably supports a guide wheel 69 having an annular, circumferential groove 70 therein. An indicator needle 71, having spike-like projections 72 which are substantially parallel with the face of the scale, as shown in FIGS. 1 and 4, is mounted on the U-shaped frame 63, substantially as shown in FIG. 2. The indicating sub-assembly 62, itself, extends from the follower clip 44 through the opening in the recess wall 45, through the scale 52, and toward the screen 16. As will be understood, the follower assembly 80 is adapted to be moved longitudinally along the track 51, guided by the wheel 69, to cooperate with the scale to display the total elapsed time.

Advantageously, a three-bladed, make-before-break switch 73 is mounted on the switch deck by a screw 74, and a buzzer 75 or other suitable alarm device is mounted to the rear support plate 18 by screws 76 and spacers 77. The central blade 78 of the make-before-break switch has a forked tongue 78' which projects into the path of the follower clip 44 and is adapted to be actuated thereby when the follower clip reaches the end of its travel at the end of the track 51.

In typical applications, the elapsed time indicator of the present invention is used to monitor the use of equipment, machinery, and the like, and to indicate total elapsed periods of operation thereof. In such applications, the monitored device is typically scheduled for overhaul, maintenance, recalibration, disposal or the like at the end of a predetermined interval, which interval is, advantageously, the total indicating interval of the elapsed time indicator. Advantageously, in these contemplated applications, the indicator is in a vertical or horizontal position with its rear housing wall 15 affixed to the mechanism or machine being monitored so that the scale 52 may be easily observed and read to determine the elapsed time of operation of the monitored device.

The indicator is appropriately wired so that the timing motor 26 will be energized during all periods of operation of the monitored device. Energization of the timing motor will cause its output to be transmitted through the gear train to rotate the drive screw, at a reduced rate, to move the follower assembly 80 across the face of the scale 52. At the end of the scale, the follower clip 44 actuates the make-before-break switch 73 to complete an electrical circuit to an electrical load, typically the buzzer 75, to initiate an alarm signal. After the buzzer circuit is made, the follower clip 44 and switch 73 cause the motor circuit to be broken to de-energize the motor 26.

When the alarm signal has been sounded, it will be necessary for an operator to attend to the monitored device and to reset the elapsed time indicator before the monitored device will be available for further service. As a specific feature, it is desired that the elapsed time indicator may not be readily reset from its face, but that it must be completely disassembled from the monitored device to make the follower clip 44 accessible. Once the spring follower clip is accessible to the operator, however, resetting may be accomplished quickly and simply, in accordance with the invention, by removing the clip 44, sliding the indicating sub-assembly 62 back along the track 51 to the "zero" scale position, and finally snapping the gripping portions 59, 60 of the clip back onto the drive screw 42 and the pin 67 of the indicating assembly 62.

Figure 7:
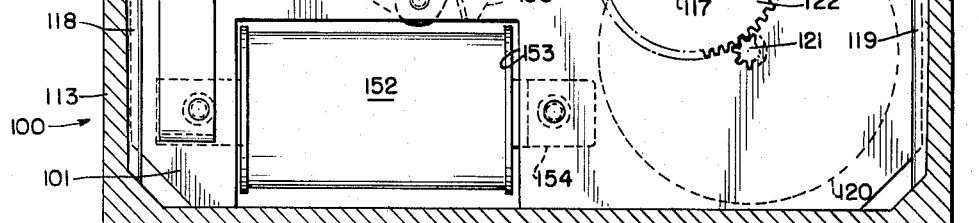
FIG. 7 is a cross-sectional view of the mechanism of FIG. 6 taken along line 7—7 thereof.
Figure 8:
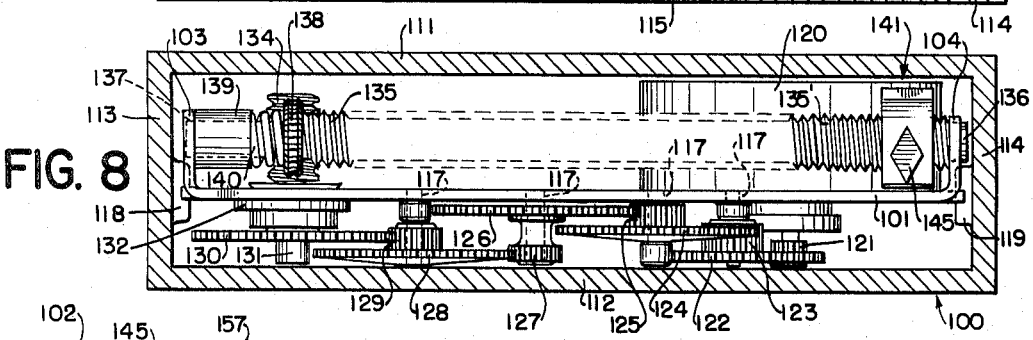
FIG. 8 is a cross-sectional view of the mechanism of the invention taken along line 8—8 of FIG. 7.

A somewhat simplified, alternate preferred embodiment of the invention is shown in FIGS. 6–9, and generally comprises a housing 100, a flat support plate 101 which carries a complete timing mechanism, and a cover screen 102 which includes a scale graduated from "0" to "1000" hours, for example, in predetermined time increments. The screen 102 is held to the housing 100 by four screws 105. More specifically, as shown in FIGS. 7 and 8, the housing 100, the typical dimensions of which are 3¼ inches in length, 7⅞ inches in depth and 29/32 inch in width, includes top and bottom walls 111, 112; side walls 113, 114; and a rear wall 115. The support plate 101 is held intermediate and parallel to the top and bottom walls 111, 112 by a pair of channels 118, 119 formed on the side walls 113, 114.

As shown in FIG. 8, the support plate 101 has two upper flanges 103, 104 extending perpendicularly therefrom and parallel with the side walls 113, 114. As an advantageous aspect of the invention, the support plate may be slidingly inserted and removed from the housing with minimal effort to facilitate assembly and to accommodate maintenance or replacement of the timing mechanism.

In accordance with another aspect of the invention, the entire timing mechanism is carried completely by the support plate 101 and includes a timing motor 120, which is mounted on the top side of the plate 101 and is of generally the same construction as the motor 26 of the first described embodiment of the invention. The output of the motor 120 is suitably geared down from a motor pinion 121 to a timing gear 130 through a gear train comprised of spur gears 122–129 mounted on shafts 117 projecting from the bottom side of the support plate 101. The timing gear 130 is mounted on a shaft 131 which is journaled in a bearing 132 and projects to the top side of the plate where it mounts a worm gear 134.

A rotatable screw 135, having end portions 136, 137 of reduced diameter and shoulders 136', and 137', is journaled in circular openings 105 in the flanges 103, 104. The screw 135, which has a spiral thread 135', carries a worm wheel 138, adjacent the shoulder 137', which meshes with the worm gear 134 to transmit the output of the motor to the screw. Assembly and disassembly of the rotatable drive screw 135 from the plate 101 are facilitated and simplified by a bushing 139 and spring 140 which are received concentrically over the reduced end portion 137. The spring and bushing act between the worm wheel 133 and the flange 103 to urge the shoulder 136' against the flange 104 and to seat firmly the reduced end portion 136 in the opening 105, while keeping the worm wheel 138 and worm gear 134 in a meshing relation.

Figure 9:
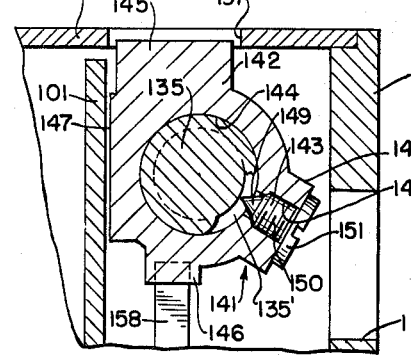
FIG. 9 is an enlarged, fragmentary, cross-sectional view of a simplified follower assembly embodying the principles of the invention taken along line 9—9 of FIG. 7.

Referring to FIG. 9, a follower assembly, indicated generally by reference numeral 141, includes a follower body 142 and a removable drive pin 143. The follower body has a longitudinal bore 144 slightly in excess of the outer diameter of the thread of the rotatable screw 135. The top surface of the follower body has an integral, diamond-shaped indicator 145 formed thereon while the bottom surface forms an integral actuating arm 146. One of the follower body side surfaces is substantially flat and constitutes a guide surface 147 which is adapted to cooperate with the plate 101 to prevent rotation of the follower body, thus ensuring its translation along the screw, as will be described in greater detail hereinafter. The remaining side of the follower body includes a boss 148 having a tapped hole 148', in which the drive pin 143 is seated. The drive pin 143 includes a conical driving portion 149, normally received in the thread 135', a threaded shank 150, and a screw head 151.

An alarm buzzer 152 is advantageously held in a notch 153 formed in the plate 101 by a strap 154 and is electrically connected to an overcentering toggle-type switch 155, which is mounted on the top side of the plate in the path of the follower actuating arm 146. The switch 155 is a single pole, double throw switch, which is appropriately wired to de-energize the motor circuit as it energizes the buzzer circuit, and includes an actuable toggle arm 158. The cover screen 102 advantageously is provided with a graduated time scale 156 aligned with a slot 157, which accommodates movement of the indicator 145 therein to enable elapsed time readings to be made more accurately and without distortion through the substantial planar alignment of the surfaces of the indicator 145 and of the cover screen 102.

Operation of the simplified embodiment is somewhat similar to that of the embodiment of FIGS. 1–5, and energization of the timing motor 120 causes the driving of the worm gear 134 through the interposed gear train. The worm gear rotates the worm wheel 138 fixed to the rotatable screw 135 to impart rotation thereto. The follower assembly 141, with its driving pin 143 seated in threaded engagement with the thread 135' of the rotatable screw 135, will be displaced longitudinally of the housing 100, the actual linear displacement being directly proportional to the duration of motor energization. The guide surface 147 acting against the plate 101 prevents rotation of the follower body 142; thus, rotation of the screw 135 will cause the body to be advanced therealong at a rate which will be a function of the speed of the timing motor and of the specific gear reduction employed. The illustrated embodiment of FIGS. 6–9 is typical of gearing which may be used in timing periods of 1,000 hours. The total elapsed time of motor operation will be reflected by the indicator 145 and the scale 156.

As the follower assembly 141 reaches the end of the scale and approaches the end of an interval being timed, the actuating arm 146 will engage the toggle arm 158 of the switch 155 to de-energize the motor and energize the buzzer, sounding an alarm. At this point, the elapsed time indicator will have performed its intended function of signaling the termination of a timed period. Resetting of the timer may then be accomplished simply, speedily, and efficiently by using a screwdriver to back the driving portion 149 of the pin 143 out of engagement with the thread 135' of the rotatable screw 135, sliding the follower assembly 141 back to its starting position, and then readjusting the driving portion 149 into engagement with the rotatable screw 135 with the screwdriver. For the purpose of more easily resetting the elapsed time indicator without the necessity of removing the cover screen 102, a longitudinal access opening 160 running parallel with the screw 135 for the length of the scale 156 is provided in the top wall 111.

The alternate, preferred embodiment of the invention thus provides a highly miniaturized, yet highly efficient and reliable elapsed time indicator which may be manufactured and assembled at minimum cost. The entire timing mechanism is carried as an entity by a support plate which may, with great facility, be inserted into or removed from a miniature housing. Moreover, the simplified, two-piece follower assembly contributes further to the efficient resettability and to the overall simplicity of the alternate embodiment.

It will be appreciated that the new and improved elapsed time indicator illustrated in FIGS. 6–9 may be manufactured easily and economically. Moreover, indicators made in accordance with the principles of the invention may be made in extremely small sizes without any sacrifice in reliability and efficiency of operation. The new and improved mechanism of the elapsed time indicator of the invention provides for rapid and simple resetting, and relatively foolproof operation, by virtue of the novel follower assembly and drive screw arrangement.

Although the present invention has been described with reference to specific, preferred embodiments, it should be understood that the disclosure has been made only by way of example and that certain changes in details of construction and arrangement of the elements may be made without departing from the spirit and scope of the invention as hereinafter claimed.

We claim:
1. A compact elapsed time indicator comprising
 (a) a flat support plate,
 (b) a timing motor supported by a first side of said plate and having an output shaft projecting through said plate to a second side,
 (c) gear reduction means supported by said second side,
 (d) flange means projecting from said first side of said plate,
 (e) a longitudinal screw rotatably supported by said flange means,
 (f) gear means associated with said rotatable screw,
 (g) said gear means, said gear reduction means, and said motor cooperating to rotate said screw at a predetermined rate,
 (h) screw follower means having a screw-engaging portion and a guide portion,
 (i) said guide portion cooperating with said support plate to prohibit rotation of said follower means,
 (j) whereby rotation of said screw effects a translating displacement of said follower means therealong, said displacement being directly proportional to the elapsed time of operation of said motor.

2. An elapsed time indicator according to claim 1 in which
 (a) an indicator means is formed on said follower means, and
 (b) said screw engaging means comprises a selectively removable thread engaging element.

3. An elapsed time indicator according to claim 1 in which
 (a) a switch means is carried by said plate in the path of said follower means, and
 (b) said switch means is positioned to be actuated by said follower means upon predetermined displacement thereof.

4. An elapsed time indicator according to claim 3, in which
 (a) an alarm means is mounted on said plate,
 (b) said switch means includes normally open contacts connected to said alarm means and normally closed contacts connected to said motor, and
 (c) said switch means is adapted when actuated by said follower means to energize said buzzer and to de-energize said motor.

5. An elapsed time indicator according to claim 1, including
 (a) a housing,
 (b) said housing defining a pair of spaced channel means,
 (c) said support plate being slidably receivable in said channel means through an open side of said housing, and (d) a cover screen for closing the open side of said housing and retaining said support plate in said channel means, (e) said cover screen exposing said follower means for observation of its displacement.

6. An elapsed time indicator according to claim 5, in which (a) said cover screen defines a longitudinal opening parallel with said rotatable screw, (b) said opening is adapted to receive said follower means therein, and (c) a linear time scale is included on said screen along said opening.

References Cited by the Examiner

UNITED STATES PATENTS

| | | | |
|---|---|---|---|
| 498,468 | 5/1893 | Fowler | 200—35 X |
| 1,506,337 | 8/1924 | Crawford. | |
| 1,894,611 | 1/1933 | Lippstadt. | |
| 2,161,273 | 6/1939 | Begun. | |
| 2,177,102 | 10/1939 | Glover | 340—323 X |
| 2,556,095 | 6/1951 | Loewenstein. | |
| 2,906,329 | 9/1959 | Frerer | 200—33.4 |
| 2,946,646 | 7/1960 | Bower | 340—309.3 X |
| 2,994,749 | 8/1961 | Gartner | 200—33.4 |
| 3,039,775 | 6/1962 | Mangano | 340—323 X |
| 3,054,038 | 9/1962 | Rast | 200—33.4 X |

NEIL C. READ, *Primary Examiner.*

R. M. GOLDMAN, *Assistant Examiner.*